Nov. 2, 1926.

H. C. MOUGEY 1,605,601

BONDING DISSIMILAR METALS

Filed Dec. 16, 1922

Witnesses

Inventor.
Harry C. Mougey
By
his Attorney.

Patented Nov. 2, 1926.

1,605,601

UNITED STATES PATENT OFFICE.

HARRY C. MOUGEY, OF DAYTON, OHIO, ASSIGNOR TO GENERAL MOTORS RESEARCH CORPORATION, OF DAYTON, OHIO, A CORPORATION OF DELAWARE.

BONDING DISSIMILAR METALS.

Application filed December 16, 1922. Serial No. 607,438.

This invention relates to the uniting of dissimilar metals such as copper and ferrous metals (iron and steel) and has among its objects the uniting of a plate of copper or other material of good heat conductivity to iron or steel.

The method described herein is applied to the uniting of an equalizer plate to the head of an iron or steel cylinder in such a manner as to produce a permanent bond providing an effective thermal connection between the iron and equalizer so that the equalizer will assist in preventing hot spots in the cylinder head. The method is susceptible of other applications as will appear from the following description of a preferred embodiment thereof.

Figure 1:
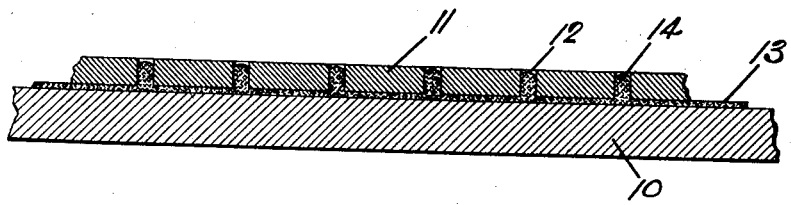
Fig. 1 is a fragmentary sectional view of a ferrous body such as a cylinder head with an equalizer plate bonded thereto.
Figure 2:
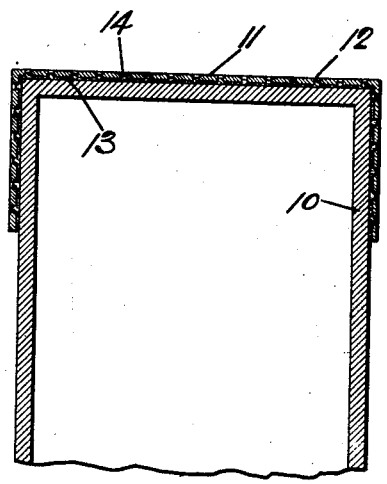
Fig. 2 is a fragmentary sectional view on a smaller scale showing a cylinder with an equalizer cup bonded to the cylinder head.

The surface of the ferrous body such as the iron cylinder head 10 is machined to receive the equalizer 11 and thoroughly fluxed with borax or other suitable flux. The equalizer 11 which may be in the form of a plate or cup is provided with a number of small holes 12 extending entirely through it. These holes are preferably $\frac{1}{16}$ inch in diameter and about $\frac{1}{4}$ inch to $\frac{3}{8}$ inch apart. The equalizer is thoroughly fluxed with borax or other suitable flux.

If the equalizer is made of copper, a bonding material 13 of sheet silver solder or sheet brass is placed between the equalizer and the cylinder as shown in the drawings, and the entire assembly is heated in any suitable manner, but it is prefered to heat in a flux bath having a temperature above the melting point of the bonding material and lower than the melting points of the copper equalizer or the iron or steel cylinder. A suitable bath can be made of equal parts of borax and boracic acid.

It is believed that some of the equalizer material dissolves in the bonding material and makes an alloy having a higher melting point than the bonding material itself, and one which tends to harden at the bonding temperature. This hardening prevents the ready flow of the flux and consequently there may not be a uniform thermal contact between the entire surface of the equalizer and the cylinder, unless one of the parts to be bonded is provided with means for the escape of the flux. Apparently the holes 12 in the equalizer provide short paths for the flux between the equalizer and cylinder to flow out from the space between the equalizer and cylinder, hence the bonding material can follow the flux and flow more uniformly in the space between the equalizer and cylinder and some of the bonding material will flow out into the holes in the equalizer as shown at 14 and form lugs which increase the strength of the bond between the equalizer and the cylinder.

If the equalizer be made of aluminum, the bonding layer 13 will be of a material which will unite with the ferrous metal and with aluminum. Certain zinc and aluminum alloys can be used for this purpose.

While the forms of embodiment of the invention as herein shown and described, constitute preferred forms, it is to be understood that other forms might be adopted, all coming within the scope of the claims which follow.

What I claim is as follows:

1. The process of bonding two metal bodies which consists in providing one of the bodies with passages through the surface to be joined for the escape of fluxing material, in assembling the bodies with a sheet of bonding material between the surfaces to be joined, a layer of flux having been applied between the bonding material and each of said surfaces, and in heating the assembly to a temperature sufficient to cause the bonding material to melt and alloy or intermingle with the bodies, the said passages permitting the escape of flux from the bonding zone and the flow of the bonding material into said passages.

2. The process of bonding a metal plate to another metal body which consists in providing the plate with a number of relatively small holes for the escape of fluxing material, in assembling the plate and other metal body with a sheet of bonding material between them, a layer of flux having been applied between the bonding material and the plate, and between the bonding material and metal body, and in heating the assembly to a temperature sufficient to cause the bonding material to melt and alloy or intermingle with the bodies, the said holes permitting the escape of flux from the bonding zone through the plate and the flow of bonding material into the holes in said plate.

3. The process of bonding dissimilar metal bodies by means of an intermediate layer of bonding material adapted on being heated to alloy or intermingle with the metal bodies, which includes providing one of the bodies with passages to allow the ready escape of fluxing material from the bonding zone.

4. The process of bonding a layer of copper to a ferrous body which includes providing the copper plate with a plurality of relatively small holes for the escape of fluxing material, assembling the layer of copper and ferrous body with a sheet of silver solder and a suitable flux interposed between the surfaces of the layer of copper and the body to be joined, and in heating the assembly to melt the silver solder to cause it to alloy or intermingle with the copper and ferrous body, the holes in the copper permitting escape of flux from the bonding zone and the flow of the solder into said holes.

5. The process of bonding two metal bodies which consists in providing one of the bodies with a sufficient number of passages extending through it from the surface to be joined to the other body to allow escape of the fluxing material, assembling the bodies with a sheet of bonding material and a suitable quantity of flux between the surfaces to be joined, and in heating the assembly to a temperature sufficient to cause the bonding material to melt and alloy or intermingle with the bodies and flux to escape from the bonded joint through the said passages.

6. An engine cylinder of ferrous material having bonded thereto an equalizer layer of metal of good heat conductivity provided with a plurality of perforations extending through the layer from the surface to be joined, there being a substantially continuous film of readily fusible bonding material located between the ferrous body and equalizer layer and extending into the holes aforesaid in said layer.

In testimony whereof I hereto affix my signature.

HARRY C. MOUGEY.